United States Patent [19]
Hill

[11] Patent Number: 5,417,441
[45] Date of Patent: May 23, 1995

[54] LOW FRICTION SEAL BETWEEN RELATIVELY MOVING PARTS

[75] Inventor: James D. Hill, PBG, Fla.

[73] Assignee: The United States of America as represented by the Secretary of the Air Force, Washington, D.C.

[21] Appl. No.: 8,912

[22] Filed: Jan. 26, 1993

[51] Int. Cl.⁶ .............................................. F16J 15/16
[52] U.S. Cl. .............................. 277/12; 277/DIG. 7; 239/265.11; 239/265.37
[58] Field of Search ................... 277/12, 230, DIG. 6, 277/DIG. 7; 239/265.11, 265.37, 397.5

[56] References Cited

U.S. PATENT DOCUMENTS

| | | | |
|---|---|---|---|
| 3,351,348 | 11/1967 | Dupis | 277/DIG. 7 X |
| 4,013,226 | 3/1977 | Willard | 239/265.37 X |
| 4,209,334 | 6/1980 | Panzera . | |
| 4,219,203 | 8/1980 | Bellavia, Jr. et al. . | |
| 4,249,846 | 2/1981 | Worsham | 277/DIG. 7 X |
| 4,441,726 | 4/1984 | Uhl | 277/230 |
| 4,530,884 | 7/1985 | Erickson et al. . | |
| 4,575,006 | 3/1986 | Madden | 277/236 X |
| 4,575,099 | 3/1986 | Nash | 277/12 |
| 4,783,085 | 11/1988 | Wicks et al. | 277/138 X |
| 4,813,608 | 3/1989 | Holowach et al. | 239/265.37 |
| 4,917,302 | 4/1990 | Steinetz et al. | 277/158 X |
| 5,014,917 | 5/1991 | Stirocky et al. | 239/265.11 |
| 5,115,979 | 5/1992 | Ellerhorst et al. | 239/265.37 |
| 5,143,292 | 9/1992 | Corsmeier et al. | 239/265.37 X |

FOREIGN PATENT DOCUMENTS

| | | | |
|---|---|---|---|
| 89437 | 6/1967 | France | 277/DIG. 7 |
| 1055020 | 1/1967 | United Kingdom | 277/DIG. 7 |

*Primary Examiner*—Scott W. Cummings
*Attorney, Agent, or Firm*—Thomas C. Stover; Donald J. Singer

[57] ABSTRACT

The invention provides a low friction gas seal between moving and stationary parts in the exhaust nozzle of a gas turbine engine. Such seal is in the form of a roller mounted on a pair of pivot arms to the movable member, which roller rides on the stationary part in sealing engagement therewith. The roller is preferably mounted behind a heat shield in rubbing (and sealing) engagement therewith. The roller has an outer tube of soft ceramic fabric for high temperature resistance and good sealing attributes. Such roller seal provides good sealing, e.g. between a convergent or divergent flap edge and the adjacent wall of an engine exhaust nozzle or between other moving and stationary parts.

9 Claims, 2 Drawing Sheets

LOW FRICTION SEAL BETWEEN RELATIVELY MOVING PARTS

The invention described herein may be manufactured and used by or for the Government for governmental purposes without the payment of any royalty thereon.

BACKGROUND OF THE INVENTION

1. Field of the Invention

This invention relates to a low friction seal between relatively moving parts particularly where there is a considerable pressure differential across such seal.

2. Prior Art

Zones of high pressure differential, particularly in gas turbine engines often require an effective gas seal to maintain such differential. This requirement has posed a challenge where a gas seal has been required between a moving part and a stationery part. For example, attempts have been made to provide a gas seal in an exhaust nozzle of a gas turbine engine between convergent and divergent flaps and the engine wall adjacent thereto. This is because on the inside of such flaps are hot core gasses at, e.g., 3,000° F. and 80 psi while on the outside of such flaps, is cooling air at, eg. 600° F. and 88 psi.

Prior art gas seals employed for sealing a moving part to a static part, e.g. a wall, have employed sliding metal-on-metal parts which have high friction, high wear rates and high leakage. The stiffness of the these seals prevent them from adjusting to surface irregularities and small deflections. Hence the high leakage.

An example of the above prior art gas friction seal is shown in FIG. 1 wherein convergent or divergent flap 10 (of a gas turbine engine) moving in proximity with housing wall 12, employs a metal strip seal 14, which slides or skids in friction contact with the wall 12. As noted above, such prior art seal is subject to high friction, wear and leakage.

Other attempts have been made to provide a gas seal between moving and stationary parts in the prior art. See for examples, U.S. Pat. No. 5,014,917 to Sirocky et al (1991). This reference discloses, per FIG. 1, a seal element 10 which is a friction seal in sliding engagement with a side wall, which can cause wear and abrasion of the seal element and/or side wall and consequent leakage problems therebetween. Accordingly there is a need and market for a gas seal between moving and stationary parts or surfaces, that obviates the above prior art shortcomings.

There has now been discovered a gas seal between moving and stationary parts or surfaces that is effective in high temperature, large delta pressure environments.

SUMMARY OF THE INVENTION

Broadly the present invention provides, a low friction gas seal between a movable member and a relatively stationary one comprising,
a) a roller,
b) a pair of arms supporting at their outer ends, the roller, which arms are mounted at their inner ends, to the movable member and
c) means for positioning the roller against the stationary member so that when the movable member moves, the roller rolls on the stationary member in sealing engagement therewith. By "roller seal" as used herein is meant "gas roller seal".

BRIEF DESCRIPTION OF THE DRAWINGS

The invention will become more apparent from the following detailed specification, and drawings in which.

DESCRIPTION OF PREFERRED EMBODIMENTS

Figure 2:
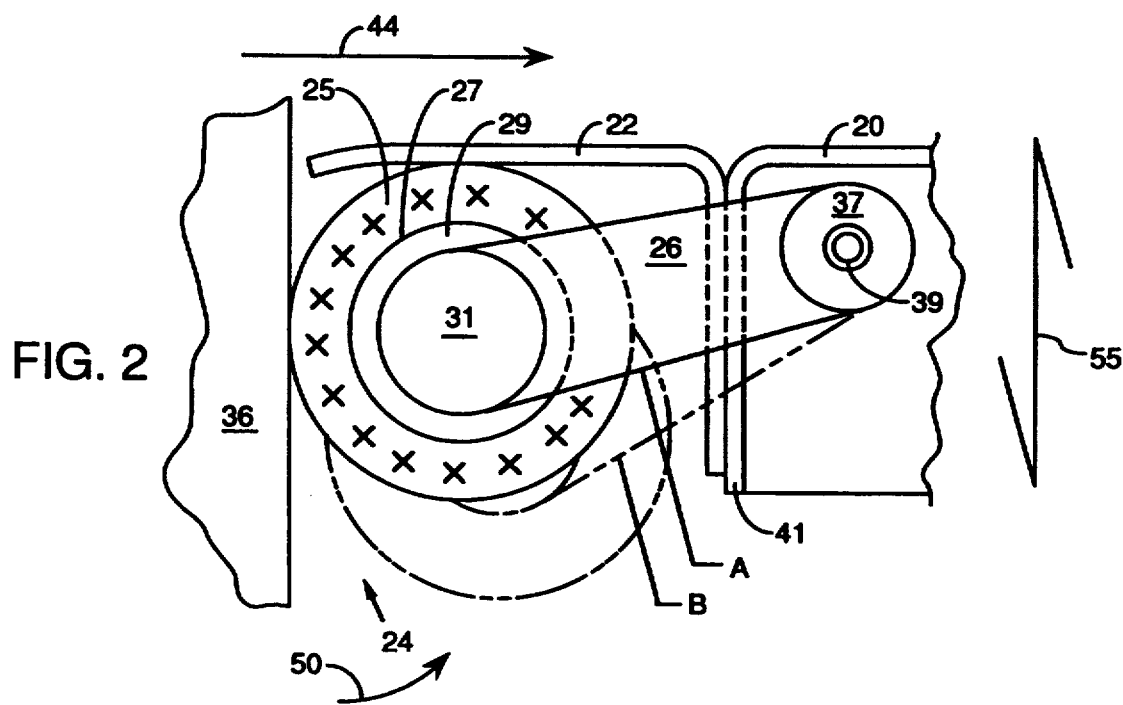
FIG. 2 is a schematic enlarged fragmentary view of a gas seal between moving and static parts embodying the invention.
Figure 3:
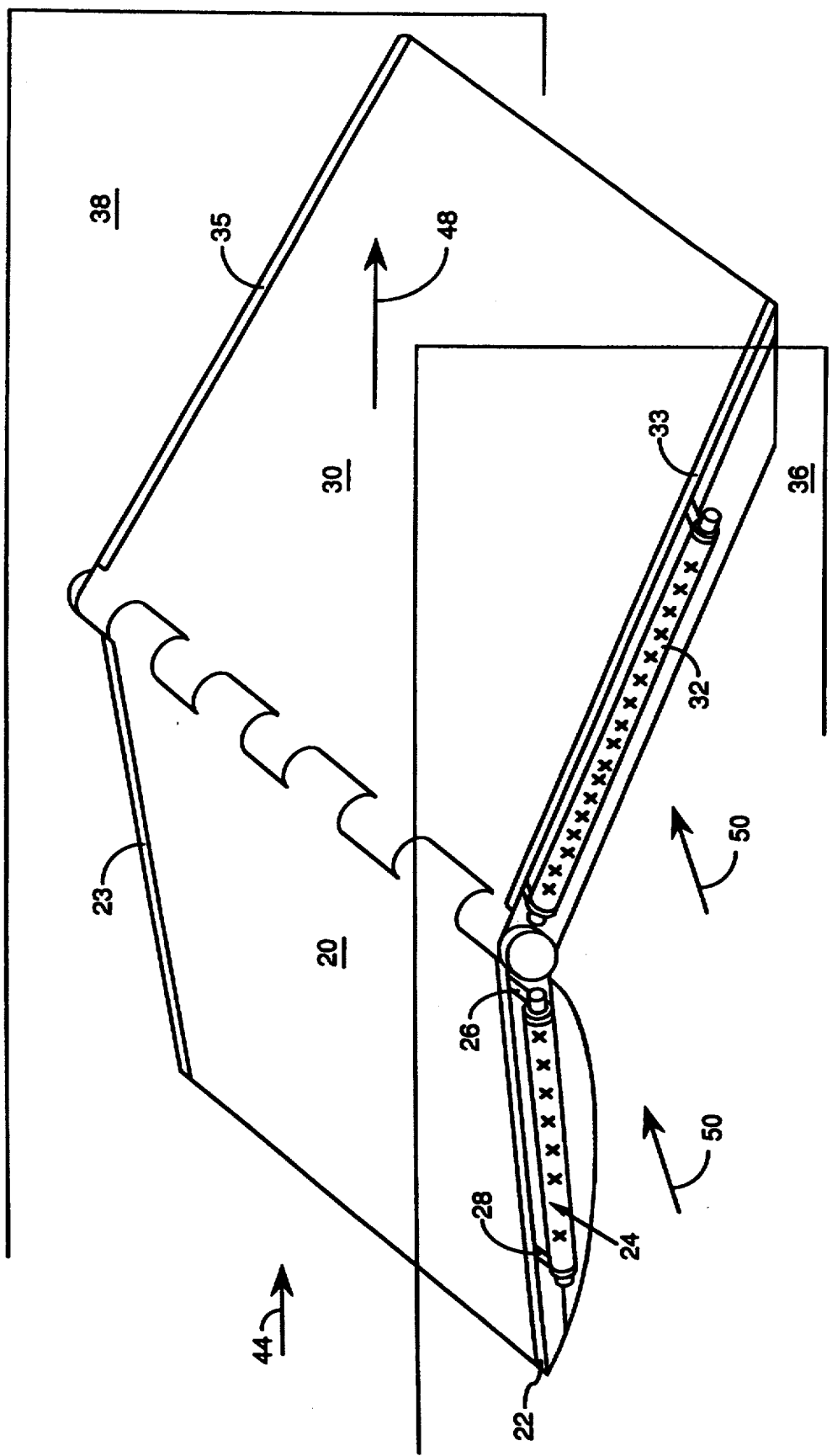

Referring to more detail to the drawings, convergent flap 20 has at each lateral edge, a heat shield, e.g. heat shield 22 and mounted thereunder, a sealing roller 24 on support arms 26 and 28, as shown or indicated in FIGS. 3 and 2.

Convergent flap 20 also has another roller seal (not shown) under heat shield 23, which is similar to roller seal 24, shown in FIGS. 3 and 2.

Similarly, divergent flap 30 has roller seal 32 mounted thereto, on its near side and another roller seal on the opposite side thereof (not shown), as shown in FIG. 3.

Accordingly, roller seals 24 and 32 roll against exhaust nozzle wall 36 in sealing engagement therewith, as indicated in FIGS. 3 and 2, while their counterpart rollers (not shown), on the other edges of the respective convergent flap 20 and divergent flap 30, do likewise. Also the roller seal 32 is mounted behind heat shield 22 while its opposite roller seal (not shown), and is mounted behind heat shield 35, as shown in FIG. 3 in the manner indicated in FIG. 2 hereof.

Figure 4:
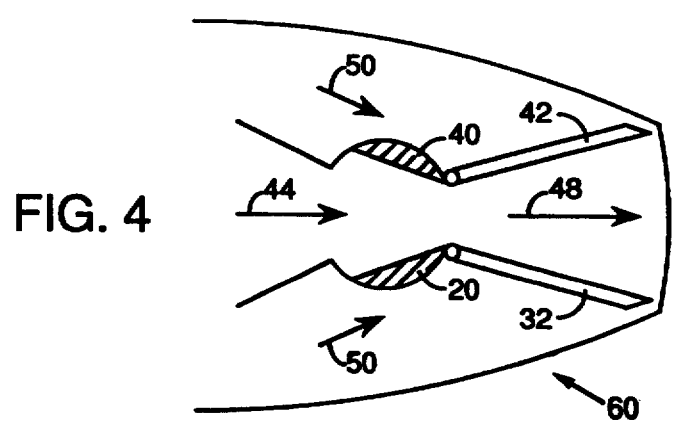
FIG. 3 is a schematic perspective fragmentary view of a moving part-static part gas seal of the invention in operation and FIG. 4 is a fragmentary schematic sectional elevation view of an exhaust nozzle of a gas turbine engine.

As shown in context in FIG. 4, convergent flap 20 works in concert with its counterpart 40 and divergent flap 32 works in concert with its opposite counterpart 42, in an exhaust nozzle of a gas turbine engine (not shown). As indicated in FIGS. 4 and 3, hot core gasses (arrows) 44 and 48 pass through the exhaust nozzle, which gasses are substantially sealed off from cooling air (arrows) 50 by the low friction seal assemblies embodying the present invention.

Returning to the roller seal. The outer roller layer 25 is a relatively soft ceramic fabric tube 25 with, e.g. nickel fibers woven into the inner surface 27 thereof, by which the tube 25 is brazed to a nickel bearing assembly tube 29, which is mounted on an axle member 31, in turn supported on pivot arm 26, as shown in FIG. 2. The pivot arm 26, is then mounted to pivot assembly 37, which is pivotedly attached to the moving part, e.g. convergent flap 20, as shown in FIGS. 2 and 3.

Adjacent the roller seal 24 is the heat shield 22, per FIG. 2, which protects the roller fabric from the worst of the hot gas environment and also provides an additional sealing surface in front of such roller.

The pivot assembly 37 can have a component, e.g. a torque tube or coiled spring 39 which permits an at-rest position B and a sealing position A. These positions assume a gas roller seal which uses positive air $\Delta P$ to maintain the seal in the sealed position, that is, with the cooling air pressure 50 greater than the core gas pressure 44.

An alternative mounting procedure would be to move the "at rest" position from B to A; this has the effect of pre-loading the gas roller seal against the sealed surface, e.g. nozzle wall 36 and the seal does not depend on greater pressure from the air cooling side for such sealing, though a pre-loaded roller may be more difficult of installation. The above roller settings thus provide two embodiments of the invention as indicated.

With either of the above roller seal embodiments, the moving part, e.g. convergent flap 20 and roller seal 24, can readily move in sealing engagement with nozzle wall 36, in either direction, per double arrow 55 shown in FIG. 2.

Figure 1:
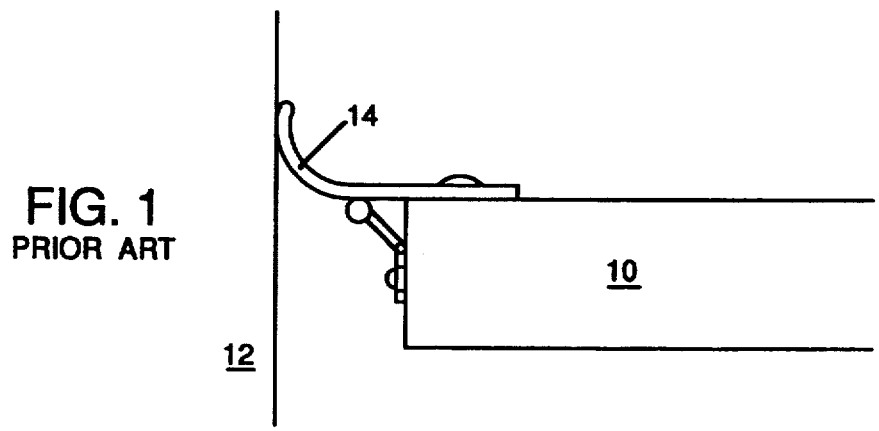
FIG. 1 is a schematic fragmentary elevation view of a gas seal between moving and static parts per the prior art.

As shown in FIG. 1, the roller seal 24 not only rolls on nozzle wall 36 but rubs on heat shield 22, so as to complete the seal between cooling air, per arrows 50 and core gas air, per arrow 44, as shown in FIGS. 2 and 3 respectively. However the pressure of the roller seal 24 is lighter on the heat shield 22 than it is on the nozzle wall 36, so as to impart light rubbing against the heat shield 22, with little discernible wear on the soft exterior roller fabric of outer layer 25.

The gas turbine engine 60 of FIG. 4 is almost always run at a positive cooling air Δ P, i.e. with the cooling air at a higher pressure than the core gas, as a fail-safe precaution so that in case of leakage, cooling air will flow into the core gas and not vice versa. Such positive air Δ P also serves to press the roller seal 24 against the nozzle wall 36 and heat shield 22 (of FIG. 2), to close such seal. Thus a pre-loaded roller seal 24 is seldom necessary, e.g. except in cases where the above Δ P drops to a low value.

Returning to the above discussion of cooling air positive Δ P. In gas turbine engine exhaust nozzles, e.g. of engine 60, shown in FIG. 4, the core gas 44 is generally run at, e.g. 60-95 psi and at temperatures of, e.g. 1100°-4200° F. Also in such nozzle, the cooling air 50 is generally run 6 to 9% higher in pressure than the above core gas. Thus in such nozzle, the cooling air is run at, e.g. 70-102 psi and at, e.g. temperatures of 400°-1000° F. Note that above temperature and pressure ranges are illustrative and it is recognized that certain engines and nozzles will run at pressures and temperatures outside of the above ranges.

Though each flap 20 and 30 of FIG. 3 is indicated as having one roller seal per edge, e.g. roller seals 24 and 32 per FIG. 3, with matching rollers (not shown) on the opposite edges of such flaps, there can be two or more roller seals per flap edge, as desired with the scope of the present invention.

For purposes of the present invention, per FIG. 2, the outer layer (or tube) 25 of roller seal 24, in the manner of a paint roller, desirably has a soft exterior surface for conforming to irregular surface contours for effective sealing and such layer 25 desirably has a hard interior surface with nickel fibers woven therein for good brazing to the bearing assembly 29. The bearing assembly 29 then slips over axle (not shown) of heat resistant material of, e.g. titanium or nickel as required. The external roller layer 25 is, as indicated above, of a soft heat resistant fabric (at its outer surfaces), which can be, e.g. a ceramic fabric such as aluminua-boron silica fiber/silica matrix. Such ceramic fiber advantageously is deposited by a sol/gel process to obtain the outer roller layer 25 as a tube with a soft exterior surface and a dense and hard inner surface, again similar to a paint roller tube. Thus preferred is a silica fiber/silica matrix deposited (on a mandrel) by the above mentioned sol/gel process. One such silica fiber which can be employed, is sold under the trademark of "Nextel."

The bearing tube 29 of FIG. 3, is desirably a nickel tube due to its high temperature resistance, but can be of other materials, e.g. titanium or stainless steel, as desired, where lower engine temperatures are employed per the invention.

Thus the present invention provides, e.g. 1) an externally soft compressible ceramic fiber tube which allows the roller seal to conform to small deflections or irregularities in the sealing surface, 2) which tube is mounted on a rolling element to eliminate rubbing friction on a stationary surface to reduce wear. In another embodiment, such roller seal is mounted on a swinging pivot arm which allows a pre-set assembly position and compensation for large radial deflections.

Thus the roller seal of the invention is suitable for sealing a moving part to a static part in high Δ T and Δ P environments.

Of course the roller seal of the invention can be employed between various moving and static parts whether of an engine or of other structure, with or without a heat shield, where effective sealing at low friction is desired. Without the heat shield 22 of FIG. 2, the roller 24 would have to be of sufficient size to engage both the stationary part 36 and the moving part surface 41, shown in FIG. 2. This embodiment is also within the scope of the invention. However, preferred is an embodiment where the roller seal of the invention contacts the stationary part 36 and a heat shield flange 22, e.g. as shown in FIG. 2.

What is claimed is:

1. A low friction gas seal between a movable part and a relatively static part comprising, a) a roller having a durable and soft surface, b) a pair of arms having outer ends which support said roller, which arms are mounted at inner ends to said movable part, c) means for positioning said roller against said stationary part so that when said movable part moves, said roller rolls on said stationary part in sealing engagement therewith and a heat shield flange mounted to said moving part and extending over said roller so that as said roller rolls it also rubs against said flange in sealing engagement therewith in a dual sealing arrangement.

2. The seal of claim 1 wherein said roller is mounted on a movable flap in a gas turbine nozzle so as to roll on a stationary surface proximate thereto.

3. The seal of claim 2 wherein said roller is mounted to said flap behind a heat shield flange so that as said roller rolls it also rubs against said flange in sealing engagement therewith.

4. The seal of claim 1 wherein said roller has an outer surface of durable and soft, woven fabric.

5. The seal of claim 4 wherein said roller has an outer surface of ceramic fiber material.

6. The seal of claim 4 wherein said roller has an outer surface of silica fiber on a silica matrix.

7. The seal of claim 3 wherein said roller seals between core gas within said nozzle, and cooling air at higher pressure than said gas, on the outside of said nozzle such that a positive air pressure presses the roller against nozzle wall and heat shield surfaces in sealing engagement therewith.

8. The seal of claim 3 wherein said roller is movable out of contact with said nozzle surface and said heat shield where there is relatively weak positive air pressure.

9. The seal of claim 3 wherein said roller and its support arms are resiliently biased against said nozzle wall and said heat shield.

* * * * *